Nov. 15, 1966  P. E. ROBINSON ETAL  3,284,847
HEADING TOOL
Filed July 2, 1964  2 Sheets-Sheet 1
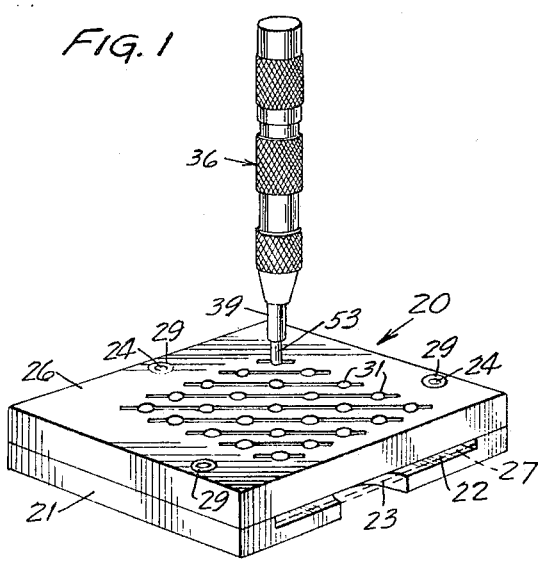
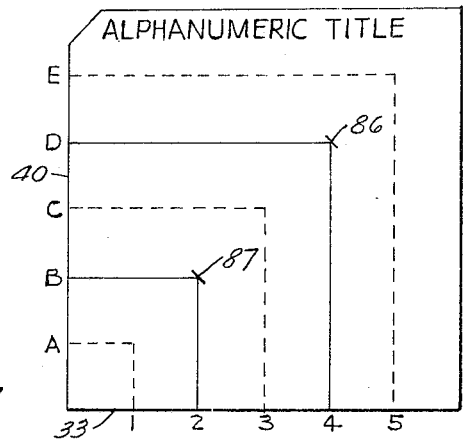
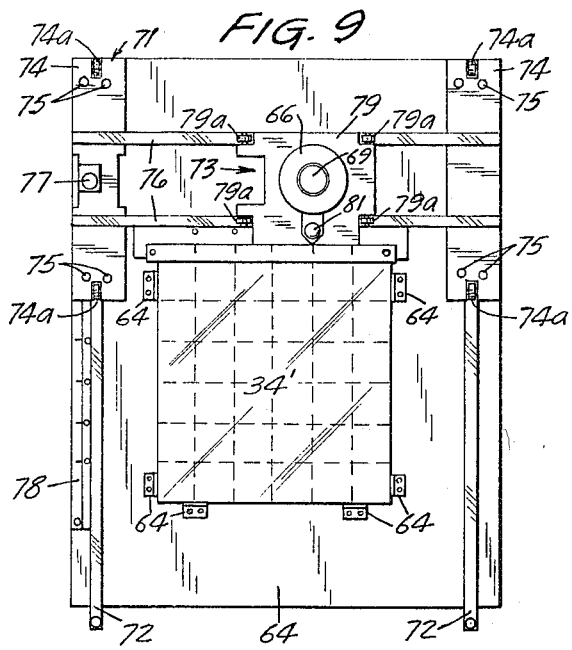
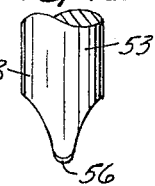
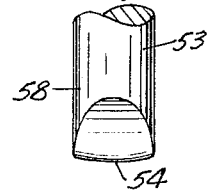
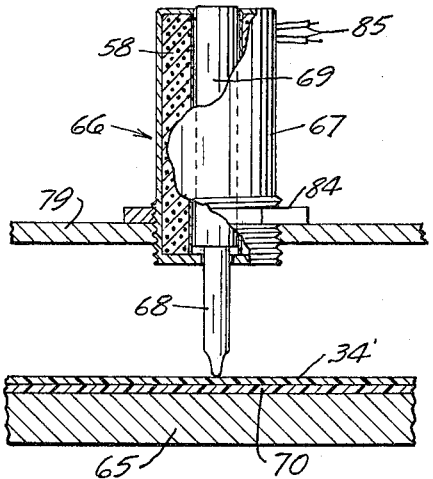
INVENTORS
PAUL E. ROBINSON
RAYMOND W. SHREWSBURY
BY
Carpenter, Abbott, Coulter & Kinney
ATTORNEYS Nov. 15, 1966 P. E. ROBINSON ETAL 3,284,847
HEADING TOOL Filed July 2, 1964 2 Sheets-Sheet 2

INVENTORS
PAUL E. ROBINSON
RAYMOND W. SHREWSBURY
BY
Carpenter, Abbott, Coulter & Kinney
ATTORNEYS

United States Patent Office 3,284,847
Patented Nov. 15, 1966

3,284,847
HEADING TOOL
Paul E. Robinson, Coon Rapids, and Raymond W. Shrewsbury, Roseville, Minn., assignors to Minnesota Mining and Manufacturing Company, St. Paul, Minn., a corporation of Delaware
Filed July 2, 1964, Ser. No. 379,829
1 Claim. (Cl. 18—1)

This invention relates to craze making apparatus. More particularly, this invention is directed to apparatus for making elongated, controlled craze marks on a crazable translucent sheet member without surface deformation and without internal cracking of such sheet member.

We have now discovered how one can employ systematically crazed crazable translucent sheet members in an information storage and retrieval system. The construction of such sheet members and the manner of using same in an information storage and retrieval system is described in the copending application of Raymond W. Shrewsbury, Ser. No. 21,276, filed concurrently herewith, and now abandoned.

In order to manufacture such crazed sheet members, we were unable to find any prior art machinery suitable for the purposes intended. We therefore found it necessary to develop the present apparatus for making elongated controlled craze marks on crazable translucent sheet members as described and do now herewith disclose our invention fully and seek Letters Patent therefor.

It is accordingly among the objects of this invention to provide apparatus for making elongated controlled craze marks on a crazable translucent sheet member having opposed parallel faces.

It is further object to provide apparatus of the class described which is capable of producing such craze marks without surface deformation and without internal cracking of the crazable translucent sheet member.

Other and further objects of this invention will become apparent to those skilled in the art from a reading of the present specification taken together with the drawings wherein:

FIGURE 1 is an isometric view of one embodiment of apparatus of this invention;

FIGURE 8 is a top plan diagrammatic view of a crazable translucent sheet member to be crazed by the embodiment of FIGURE 1;

FIGURE 9 is a top plan view similar to FIGURE 3 but showing an alternative embodiment of the present invention;

FIGURE 10 is a side view showing the solenoid actuated head used in the embodiment shown in FIGURE 9;

FIGURE 11 is an enlarged side elevational view of the head construction used in the embodiments of FIGURES 1 and 9;

FIGURE 12 is a view similar to FIGURE 11, but showing an enlarged and elevational view.

Figure 3:
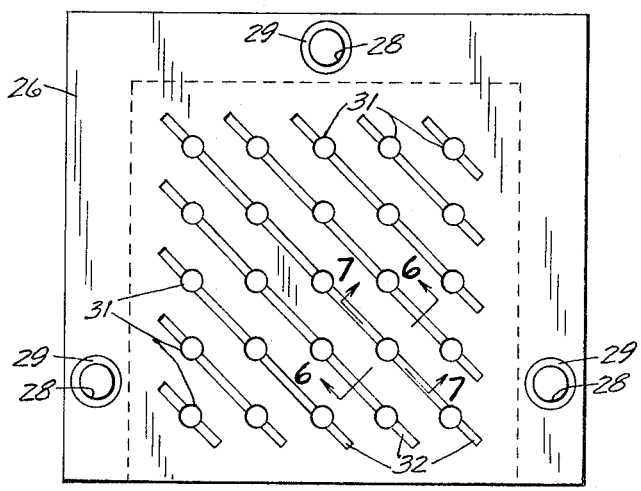
FIGURE 3 is a top plan view of the grid plate registering means of the embodiment of FIGURE 1.
Figure 2:
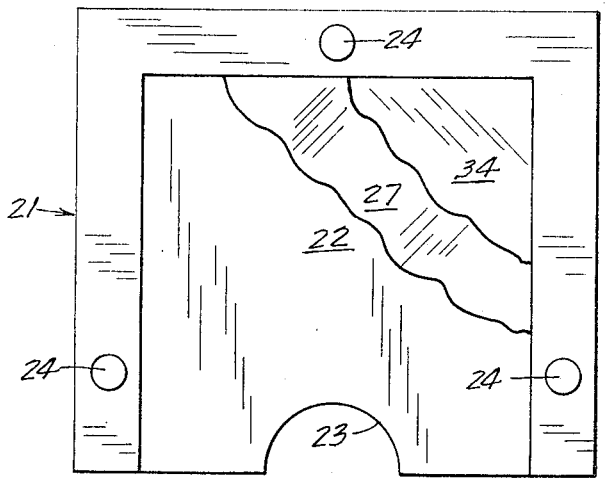
FIGURE 2 is a top plan view of the platen member of the embodiment of FIGURE 1.
Figure 4:
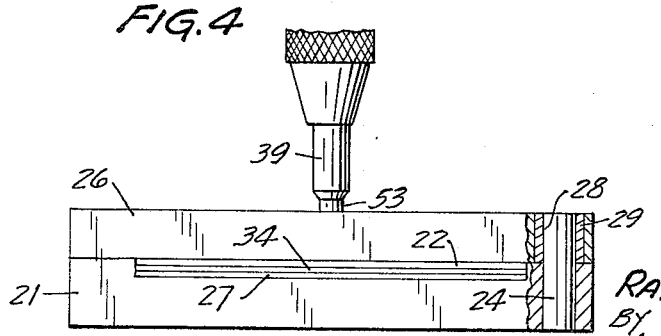
FIGURE 4 is a side elevational view of the front of the embodiment shown in FIGURE 1, some parts thereof broken away, and some parts thereof shown in section.

Referring to FIGURES 1–7 there is seen one embodiment of craze making apparatus herein designated in its entirety by the numeral 20. Apparatus 20 is seen to employ a platen member 21. Platen 21 is seen to be embossed in the mid-portion of its upper face so as to provide a recessed region 22 therein. The forward face of platen 21 is provided with a thumb slot 23 for manual convenience in operating the apparatus 20.

The face of recessed region 22 is essentially planar while the perimeter of recessed region 22 is sized so as to essentially match that of a storage medium 34 (to be described below; see FIGURE 8). The depth of recessed region 22 is such as to accommodate storage medium 34 and resilient pad member 27 in registry with each other, as shown, for example, in FIGURE 4.

Resilient pad member 27 is adapted to make the surface of recessed region 22 resilient. Here pad 27 is constructed of an elastomeric material having a shock-type tension loading characteristic which permits local deformation thereof under localized impact. The pad 27 can be constructed of any appropriate material having the desired elastomeric characteristics such as polyurethane foam, polystyrene neoprene, butadiene-styrene, natural rubber, etc.

Figure 5:
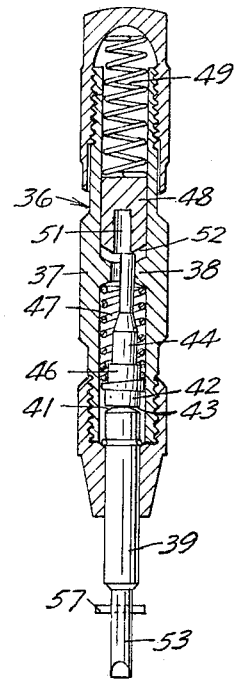
FIGURE 5 is a vertical, sectional view taken axially through the striking tool of the embodiment of FIGURE 1.

A strikerhead, here a modified automatic center punch designated in its entirety by the numeral 36, is employed for striking the upper face 30 of storage medium 34. While the operative principle of this center punch is the same as disclosed and described in U.S. Patent No. 2,384,707, the same will be described herein briefly for purposes of completeness. Thus, center punch 36 has a tubular housing 37 having a constriction 38 positioned intermediate its respective ends; constriction 38 provides a camming element. A punch plunger 39, which is slidably mounted in one end of housing 37 has a stump portion 41 within the central region of the housing 37. Mounted within the central chamber of the housing 37 above stump 41 is a tumbler 42 which has a head 43 adapted to bear against the stump 41 of plunger 39. Tumbler 42 on the end opposite its head 43 is equipped with a stem 44 which extends normally into and through the constriction 38. Between the lower end of the stem 44 and the tumbler 42 is a tapered cam portion 46 which is adapted as stem 44 is urged through constriction 38 by a spring means 47 to engage the camming element 46 and move the extremity of the stem 44 remote from the head 43 from a position offset (as shown in FIGURE 5) with respect to the access of housing 37 to a substantially centered position (not shown). On the opposite (upper) side of constriction 38 is a hammer 48. The hammer 48 is slidable in housing 37. A spring 49 urges the hammer 48 toward the constriction 38. Hammer 48 has a channel 51 axially bored into its lower end. The dimensions of channel 51 are such that the adjoining face 52 to channel 51 in hammer 48 is adapted to be engaged by stem 44 when in its offset position. The channel 51 is adapted to receive the stem 44 when the stem 44 is in its aligned position so that when the stem is received in the channel 51 of hammer 48, stem 44 is driven downwardly by springs 49 and 47 into impact engagement with punch plunger 39 thereby to provide a predetermined desired impact force against one end of punch plunger 39.

The forward end of punch plunger 39 is formed into a head portion 53. Head portion 53 has two arcuate surfaces (referring to FIGURES 11 and 12) numbered respectively as 54 and 56. Arcuate surface 54 is positioned substantially normally with respect to arcuate surface 56. Arcuate surface 54 has an overall length and associated radius of curvature which is very much greater than the length and associated curvature of the arcuate surface 56. The length of arcuate surface 54 is substantially equal to the length of a desired craze mark in a crazable translucent sheet member to be crazed by the apparatus 20.

In order to register punch tool 36 and the platen member 21 with respect to one another, a grid plate registering means 26 is provided. Plate 26 is equipped with holes 28 each of which is lined with a bushing 29. Platen 21 is equipped with 3 studs 24 so positioned that when the grid plate 26 is positioned over the platen 21 the holes 28 are adapted for slidable engagement with individual respective studs 24 thereby to effect registration of the grid plate registering means 26 with the platen member 21.

The grid plate 26 is provided with a plurality of regularly spaced apertures 31 which extend normally through grid plate 26. The apertures 31 are arranged in a square, ordered pattern so as to provide in the embodiment shown, respective rows (horizontally extending in FIGURE 3) and columns (vertically extending in FIGURE 3) each row and column containing an equal number of apertures 31.

Diagonally extending across holes 31 at a 45° angle with respect to the rows and columns are a plurality of grooves 32.

Platen 21 and grid plate 26 can be constructed of any conventional material though low density metals are preferred such as aluminum, magnesium, and the like. The holes 31 can be formed by any conventional operation such as molding, drilling or the like and the slots 32 can be formed by any conventional operation such as molding, milling or the like.

The shank region 58 of head portion 53 of punch 36 is such as to permit slidable engagement of head portion 53 with any one of the holes 31 in grid plate 26. In an assembled apparatus 20, the shank region 58 of head portion 53 is positioned in a preselected hole 31. Through the shank region 58 of the head portion 53 diametrically extends a stop member 57. When a shank region of head portion 53 is inserted into a hole 31, the stop member 57 is positionable so as to rest very loosely in that particular slot 32 which traverses the respective hole 31 into which the shank region of head portion 53 is inserted.

Thus it is seen that the grid plate 26 is adapted to register punch tool 36 and the platen member 21 with respect to one another so as to cause the head portion 53 of punch 36 to impact normally against sheet-like material 34 positioned in the recessed region 22 of platen 21 and at the same time maintain a predetermined angular relationship between the upper face 35 of the storage member 34 and an edge portion of a storage member 34 such as edge 33.

Figure 6:
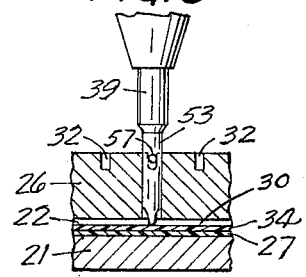
FIGURE 6 is an enlarged, detailed sectional view vertically taken along the line 6—6 of FIGURE 3 showing the striking tool in a retracted position.
Figure 7:
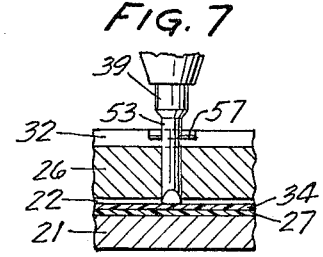
FIGURE 7 is an enlarged, detailed sectional view vertically taken along the line 7—7 of FIGURE 3 and showing the striking tool in an extended position.

The action of punch 36 in an assembled apparatus 20 is better understood by reference to FIGURES 6 and 7. When the upper end of punch 36 is depressed from its normal or relaxed position as shown in FIGURE 6, the head portion 53 slidably descends through a hole 31 until the head portion 53 contacts a surface of a sheet 34, as shown in FIGURE 7. When the punch plunger 39 is struck by the tumbler 42, the result is that the head portion 53 is given an impact force downwardly against the surface of sheet 34 whereby the desired craze mark is produced.

It will be appreciated that while head portion 53 has two arcuate surfaces 54 and 56 defined therein, other and equivalent constructions for head portion 53 will be apparent to those of ordinary skill in the art.

In FIGURE 9 is shown a top plan view of an alternative embodiment of apparatus of this invention. Here on a platen 65 is positioned a storage medium 34' by means of a plurality of stop members 64 secured to platen 65. Stage medium 34 is positioned over a pad 70 constructed in the manner of pad 27. The apparatus is equipped with a striking tool, herein designated in its entirety by the numeral 66, which is actuatable by a solenoid 67 (see FIGURE 10). Solenoid 67 permits one to apply a predetermined impact striking force to its head portion 68 since the distance of solenoid 67 from a medium 34 is adjustable by means of rotating solenoid 67 on the circumferentially extending threads upon its base while solenoid 67 is threadably engaged in nut 84.

Head portion 68 is constructed similarly to the embodiment shown in FIGURES 11 and 12; it is adapted to connect with a punch plunger 69 which moves slidably and axially within solenoid 67. The channel in solenoid 67 in which the punch plunger 69 rides carries an axially extending shoulder (not shown) which rides rather loosely in a mating groove (not shown) in punch plunger 69, whereby the head portion 68 of tool 66 is caused to maintain a predetermined fixed orientation relative to the side of storage medium 34'. Spring means (not shown) serves to return punch plunger 69 to its normal position of rest after actuation by the passage of an electric current through the winding 80 of solenoid 67.

Means for registering the respective positions of tool 66 and platen 65 to cause the head portion 68 to impact preferably normally against the exposed face of storage medium 34' positioned upon platen 65 is provided by a slide assembly, herein designated in its entirety by the numeral 71. The slide assembly 71 is seen to have a pair of spaced parallel rails 72 each one being positioned adjacent an opposed side of platen 65 intermediate between the respective adjacent opposed side edges of storage medium 34'.

Each of the rails 72 is adapted for engagement with an overhead stage assembly herein designated in its entirety by the numeral 73.

Stage 73 comprises a pair of skids 74 and a pair of tubular members 76 interconnecting respective ones of said skids 74. Each one of said skids 74 rides a different one of said rails 72. Each skid 74 is equipped with a pair of guide arms 75 which position a skid 74 relative to its associated rail 72. The skids 74 are interconnected by tubular members 76. Tubular members 76 transversely extend between the skids 74 normally with respect to each of the rails 72, the tubular members 76 being laterally spaced with respect to one another. One of the skids 74 is equipped with a screw clamp means 77 which is adapted to grasp the adjacent rail 72. A scale 78 allows for incremental adjustments of stage 73 relative to platen 65.

A platform carriage 79 is mounted upon the tubular members 76 for transverse sliding movements between each of the rails 72. Through carriage 19 in the midregion thereof is mounted the tool 66, tool 66 being threadably engaged with nut 84, nut 84 being welded in place over an appropriate aperture in carriage 79. The relative position of head portion 68 to the exposed surface of medium 34' is thus adjustable by screwing solenoid 67 in nut 84.

Screw clamp means 81 is positioned in carriage 79 for engagement with one tubular member 76 so as to clamp the carriage 79 in a predetermined position. A scale (not shown) 82 parallels one of the tubular members 76 to permit incremental adjustments of carriage 79 relative to platen 65. Thus by means of the slide assembly 71 the head portion 68 of tool 66 is precisely positioned over a predetermined situs of storage medium 34' positioned upon platen 65.

When it is desired to produce an elongated controlled craze mark upon storage medium 34' at a predetermined situs one positions stage 73 and carriage 79 so as to locate tool 66 at the desired location over the exposed surface of medium 34', the relative height of the tool 66 relative to the exposed surface of medium 34' having been previously adjusted so as to produce the desired craze mark without surface deformation and without internal cracking of medium 34'. Next, solenoid 67 is actuated through wires 85 and the head portion 68 is impacted against the surface of medium 34' to produce the desired craze mark.

Those familiar with such translucent organic polymeric sheet materials such as polystyrene and the like will readily appreciate there is a well-known class of organic translucent or transparent sheet materials which are crazable. An elongated controlled craze for purposes of this invention can be considered to be an imperfection within a sheet member which will reflect incident striking light traveling generally transversely therethrough but which is at the same time substantially invisible when a face of such sheet member is observed optically from one face or the other. Such crazes do not have associated with them internal cracking of such sheet member and do not have associated with them surface physical deformation or any other measurable imperfection in the overlying or underlying face of such sheet member. Such crazes are particularly desirable because when such crazes are properly shaped and positioned with a given storage medium construction they can be used for information storage and retrieval purposes and indicated without in any way appreciably interfering with the utilization of such construction for storage of material of information upon either face thereof. Thus, such a storage medium 34 can bear upon one surface thereof microfilm images which can be blown back and formed into conventional hard copy without any loss of resolution capability owing to the fact that a microfilm image happens to be positioned over such a craze mark.

Storage media bearing controlled elongated craze marks thus find great value for the storage and retrieval of information. So far as we are aware, such craze marks on crazable translucent sheet members which do not have associated with them surface deformation and internal cracking of such sheet member can now be produced only by apparatus of the type disclosed and described in the present specification.

A crazable translucent sheet member having opposed parallel faces is diagrammatically shown in FIGURE 8 and termed storage medium 34. The medium 34 for illustrative purposes is shown as bearing two elongated controlled craze marks 86 and 87, respectively. Each of these craze marks is positioned at a 45° angle relative to side edges 33 and 40. To illustrate the utility of apparatus of this invention, the use of the craze marks 86 and 87 to store information will now be described. Considering the edge 33 as the abscissa and the edge 40 as the ordinate in a rectangular coordinate system wherein units on edge 33 are numbered consecutively 1–5 and units on edge 40 are lettered consecutively A–E, it is seen that the intersection of respective projections from 2 and B intersect the craze mark 87 and that projections from 4 and D intersect the craze mark 86. Preferably each edge 33 and 40 is polished for good light transmission characteristics.

When a beam of light is passed through edge 33 normally thereto at 2 it intersects craze mark 87 and is reflected sidewise through B on edge 40. Similarly, when a beam of light is normally passed through edge 33 at 4 it strikes craze mark 86 and is reflected therefrom through edge 40 at D. By observing the reflected light at B and D, the presence of craze marks 87 and 86 respectively is detected. Thus craze marks 87 and 86 represent information bits which are retrieved by edgewise examination of medium 34. Conveniently for reference purposes medium 34 can be equipped with an alpha-numeric title as shown.

While in the apparatus embodiments shown in this invention a square storage medium 34 or 34' is used for illustrative purposes, it will be appreciated that the apparatus of this invention can be used with any crazable translucent sheet member having opposed parallel faces independent of whether such sheet material is straight sided or round sided, though due consideration must be given to the placing of craze marks on any such sheet member at predetermined locations so as to provide a crazed product having utility for the particular application. Similarly, while craze marks 86 and 87 are shown to be generally straight or linear, it will be readily appreciated that one can produce elongated controlled craze marks which are concavely or convexly curved with respect to a side edge such as 33 or 40 so as to produce special optical effects. In other words, referring to head portion 53 for illustrative purposes, the arcuate surface 54 can be so curved as to produce a lateral curvature in arcuate surface 56 when looking at arcuate surface 56 from an edgewise vantage point without departing from the spirit and scope of the invention.

Those skilled in the art wlil readily appreciate that surface hardness characteristics, sheet thicknesses, sheet composition, spring tensions, etc., can vary so that it is not possible to give specific information as to the exact momentum which a head portion must apply to a crazable translucent sheet member to produce such a craze. However, by minor adjustments of the means for applying predetermined striking force to such a head portion the optimum amount of impact force or momentum can be determined readily by one having ordinary skill in the art.

While only two preferred embodiments of the invention have been specifically shown and described, various modifications may be made therein without departing from the spirit and scope of the invention, and it is desired therefore that only such limitations shall be placed on the invention as are imposed by the prior art and are set forth in the appended claim.

Having described our invention, we claim:

Apparatus for making elongated controlled craze marks on a crazable translucent sheet member having opposed parallel faces without permanent surface deformation, and without internal cracking thereof, said apparatus comprising:

(a) a platen member adapted to register and to support one face of a said sheet member, (b) said platen member having a resilient surface contacting said one face, (c) a tool for striking the other face of a said material, (d) said tool including a head portion adapted for normal impact against a localized situs on said other face, (e) said head portion terminating in an elongated edge curved both in its lengthwise and in its transverse directions, the arc defining the length of said elongated edge being very much greater than the length of the arc defining the transverse direction, (f) means for registering said tool and said platen member with respect to each other to cause said head portion to impact normally against said other face at a predetermined situs and for maintaining a predetermined angular relationship between said one surface and an edge portion of a said sheet material, and (g) means functionally associated with said tool and said registering means for applying a predetermined force to said head portion, thereby to produce in a said sheet material a desired said craze mark.

References Cited by the Examiner
UNITED STATES PATENTS

| | | | |
|---|---|---|---|
| 1,182,420 | 5/1916 | Ramberg | 101—32 |
| 1,529,500 | 3/1925 | Osborne | 101—32 |
| 1,952,901 | 3/1934 | Wolffe | 101—32 |
| 2,773,163 | 12/1956 | Boyajean | 18—1 |
| 2,851,774 | 9/1958 | Bronner | 18—1 |
| 3,054,494 | 9/1962 | Rizzetti | 101—32 |
| 3,128,497 | 4/1964 | Alles | 18—1 |
| 3,179,975 | 4/1965 | Nacci et al. | 18—1 |

WILLIAM J. STEPHENSON, *Primary Examiner.*